April 17, 1928.  
M. A. CRAIG ET AL  
1,666,775  
FLUID PRESSURE LOCKING MEANS FOR CAR DOORS  
Filed March 10, 1927
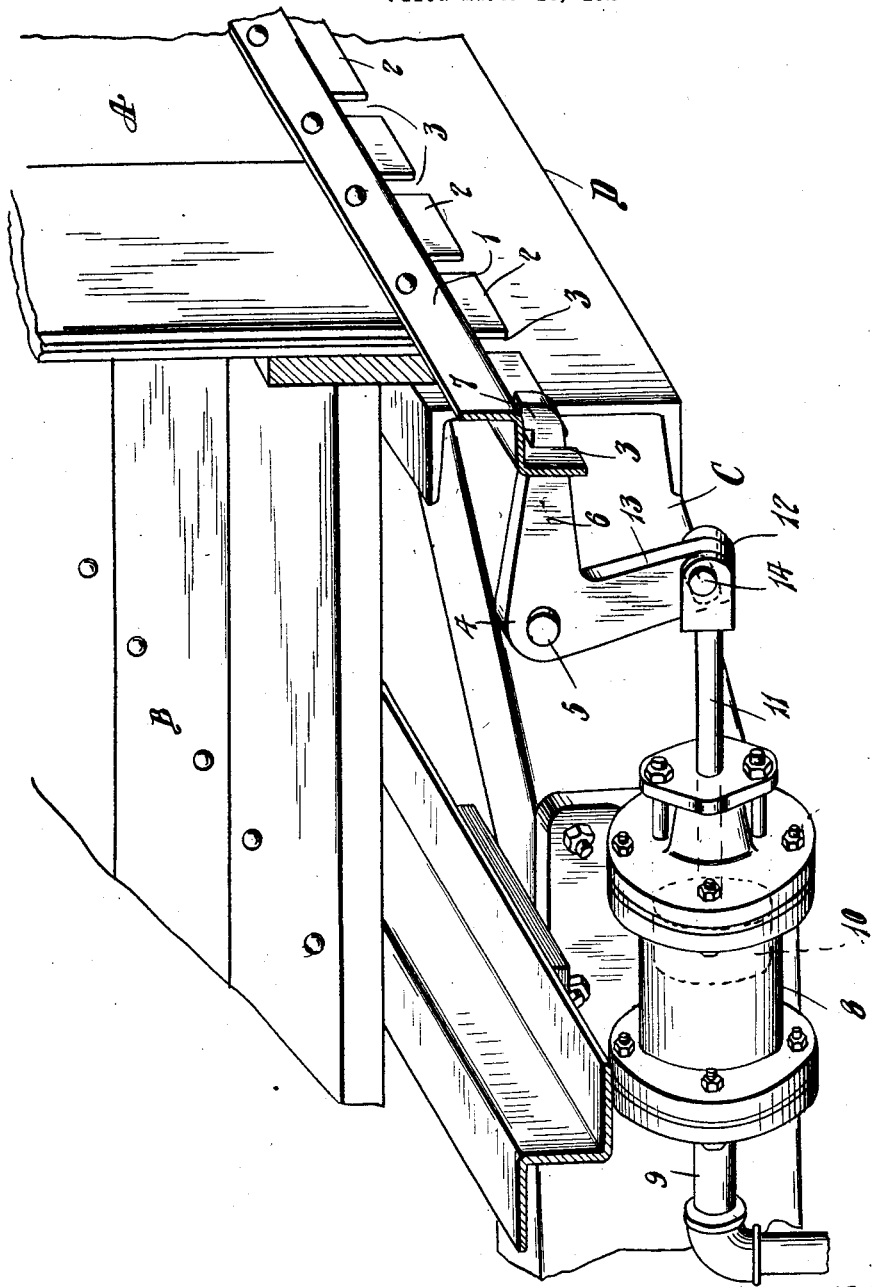
Inventors  
M. A. Craig, R. P. Steen and  
S. A. Logsdon.  
By  
Attorney Patented Apr. 17, 1928.

1,666,775

UNITED STATES PATENT OFFICE.

MILTON A. CRAIG, RAPHA P. STEEN, AND SANFORD A. LOGSDON, OF LIMA, OHIO.

FLUID-PRESSURE LOCKING MEANS FOR CAR DOORS.

Application filed March 10, 1927. Serial No. 174,372.

The invention relates to means for locking doors of freight cars, and has for its object the provision of a positive lock to prevent unauthorized opening of the door of a car while the car is in transit.

A further object of the invention is the provision of a lock for car doors that is held in locked position by means of the air pressure in the air brake train line of the car and so arranged that as long as the pressure is in the train line the lock will be held in a locking position.

A further object of the invention is the provision of a flanged plate adapted to be secured to the bottom of the car door and having one or more notches therein, and providing a latching member pivotally mounted adjacent to the door opening to engage in a notch in the plate to hold the door in closed position, and providing a cylinder connected with the train line of the air brake system with a piston to said cylinder having connection with the latch member to move the latch member into engaged position when the air brake pressure is exerted, while the car is in motion, to prevent unauthorized opening of the car door while the car is in transit.

The invention will be described in detail hereinafter and will be found illustrated in the accompanying drawings, the figure representing a fragment of a car and a door broken away and showing the improved locking means applied thereto, the view being in perspective.

Referring to the drawing the car door is represented at A, the car at B, the floor of which is supported by the cross sills C having one end secured to the side sill D. The locking means comprises a Z-shaped bar 1 secured to the car door by one of its flanges and having its other flange 2 provided with notches 3. A latch member 4 of a bell-crank type is pivotally mounted as shown at 5 to the cross sills C, and has an arm 6 adapted to engage in one or the other of the notches 3 and provided with an upturned end 7 to engage the flange 2 above the notch to prevent outward swinging of the door when in locked position as shown in the drawing, it being clearly understood that the engagement of the arm 6 with the notch 3 will prevent sliding movement of the door.

8 indicates a cylinder that is connected by means of a branch line 9 with the train line pipe (not shown) of an air brake system on the car and 10 indicates a piston or plunger in the cylinder 8 with a piston or plunger rod 11 extending through the head of the cylinder and provided with a bifurcated head 12 pivotally engaging the arm 13 and the latch member 4 by means of pivot pin 14, it being understood that engagement of the pivot pin 14 with the arm 13 will be a loose connection to permit movement of the arm 13 through an arc sufficient to permit withdrawal of the arm 6 from engagement with the notch 3.

From the above description it will be understood that in operation after the car is closed and locked with the locks commonly used for car door closures the door will be further protected from being opened while the car is in transit by the locking mechanism shown and described, as when the brakes on the train of which the car is a unit are released the pressure in the train line pipe will impart movement to the piston 10 to swing the latch member 4 so that the arm 6 is engaged in notch 3 in the flange 2 of the Z-shaped bar 1, and this engagement of the flange through the notch 3 by the arm 6 will prevent sliding movement of the door to open it and will also prevent movement of the door by swinging it outwardly away from the car by engagement of the upturned end 7 with the flange 2 above the notch.

What is claimed is:—

A device of the nature stated, comprising a plate adapted to be secured to a car door and having a depending notched flange, a latch member suitably pivoted and having angularly related arms, one of said arms adapted to engage in a notch in said flange, a fluid pressure cylinder, a piston in said cylinder, and a piston rod connected with said piston and operatively engaging the other arm of said latch member.

In testimony whereof we affix our signatures.

MILTON A. CRAIG.
RAPHA P. STEEN.
SANFORD A. LOGSDON.